C. J. JENSEN.
SUBSOILER PLOW ATTACHMENT.
APPLICATION FILED JUNE 7, 1912.

1,103,293.

Patented July 14, 1914.
2 SHEETS—SHEET 1.

Witnesses:

Inventor:

C. J. JENSEN.
SUBSOILER PLOW ATTACHMENT
APPLICATION FILED JUNE 7, 1912.
1,103,293.
Patented July 14, 1914.
2 SHEETS—SHEET 2.
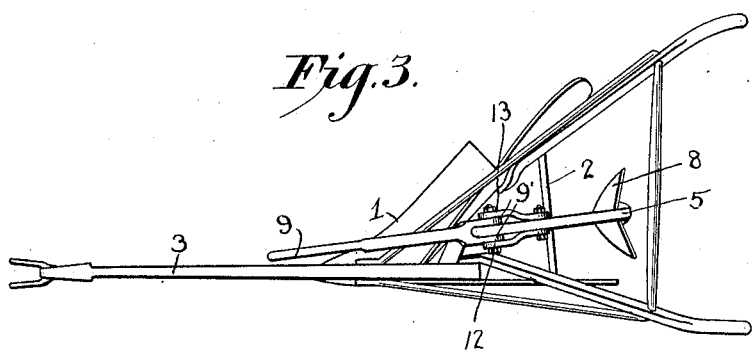
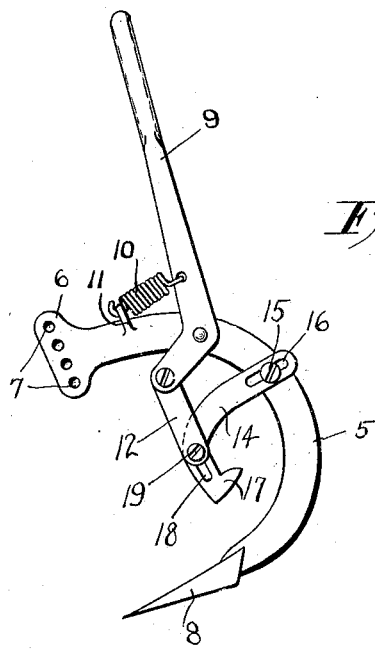

UNITED STATES PATENT OFFICE.

CHRISTIAN J. JENSEN, OF PRESTON, IDAHO.

SUBSOILER PLOW ATTACHMENT.

1,103,293.   Specification of Letters Patent.   Patented July 14, 1914.

Application filed June 7, 1912. Serial No. 702,368.

*To all whom it may concern:*

Be it known that I, CHRISTIAN J. JENSEN, a citizen of the United States, and a resident of Preston, in the county of Oneida and State of Idaho, have invented certain new and useful Improvements in Subsoiler Attachments for Plows.

This invention relates to improvements in subsoiler attachments for plows and more especially to attachments which may be removed from one plow and applied to another.

The object of the invention is to provide an attachment of this character which may be readily attached to any plow and which is provided with means for actuating it either from above or behind the plow thus adapting the device for use on either riding or walking plows.

With these and other objects in view, the invention consists of certain novel features of construction, and the combination and arrangement of parts as will be more fully described and claimed.

Figure 1:
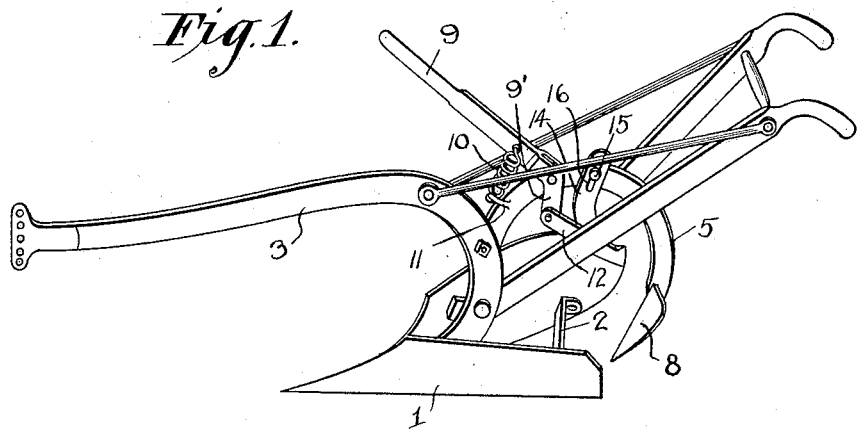
Figure 2:
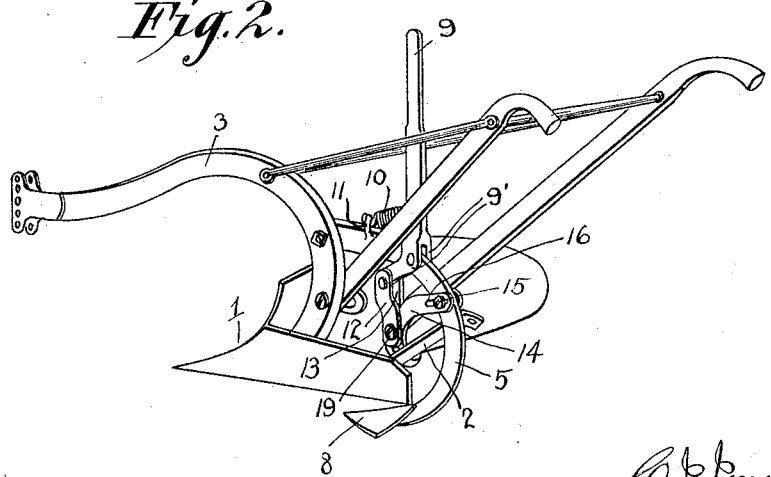

In the accompanying drawings: Figure 1 represents a perspective view of a plow equipped with this improved attachment and taken from the landside of the plow showing the attachment when raised or in inoperative position; Fig. 2 is a similar view showing the subsoiler in depressed operative position; Fig. 3 is a plan view of the plow; Fig. 4 is a side elevation of this improved attachment detached.

In the embodiment illustrated a plow 1 of ordinary construction is shown having a brace 2 connecting the landside and mold board thereof and provided with the usual beam 3 having its rear end downturned and secured to the mold board by bolts in the usual manner.

This improved attachment comprises a semicircular beam 5 preferably composed of metal and having a clevis 6 at its front end for adjustable engagement with the rear end of the beam 3 and at a suitable point preferably about midway of the height of the curved portion thereof. The clevis 6 is here shown provided with four bolt holes 7 to provide for its adjustable connection but it is obvious that any desired number may be employed. The free end of the beam 5 has a shovel 8 detachably secured thereto in any suitable manner and this shovel may be of any desired shape, the one here shown being substantially heart shaped.

The operating mechanism for this subsoiler comprises a bell crank lever 9 fulcrumed to the beam 5 near the front or clevis end of said beam and this lever is held yieldably in position by a coiled spring 10 connected at one end with said lever and at its other end to a lug or eye 11 which projects from the beam 5 as clearly shown in the drawings. The bell crank lever 9 is preferably bifurcated to straddle the beam 5 and to the front ends of the arms 9' thereof which are arranged on opposite sides of said beam 5, are pivotally connected links 12 and 13, the free ends of said links being offset inwardly as shown clearly in Fig. 3. A curved hook 14 is preferably mounted on the beam 5 at the rear of the lever 9, the end which engages said beam being preferably bifurcated as shown in Fig. 2, to receive the beam between the forks thereof and is adjustably secured to the beam by means of a bolt 15 which passes through longitudinally extending slots as 16 in said hook end and through an aperture in the beam 5 whereby said hook is adjustably connected with said beam, the free end of the hook 14 adjacent the nose or catch 17 thereof has a longitudinal slot 18 with which the bolt 19 which connects the links 12 and 13 with said hook is adjustably engaged. By means of these slots it will be obvious that the operating mechanism may be adjusted to adapt the subsoiler to extend into the ground a greater or less depth as may be desired. The hook 17 is designed to engage the cross brace 2 which connects the landside and mold board of the plow when the subsoiler is in operative position as shown clearly in Fig. 2 and which holds said attachment in this position against the tension of the spring 10. When the hook is disengaged from the brace 2 the spring 10 will elevate the beam 5 and lift the plow point or shovel 8 out of the ground, as shown in Fig. 1. When the parts are in the position shown in Fig. 2 and it is desired to lift said soiler out of the ground the lever is moved rearwardly just far enough to disengage the hook 17 from the brace 2 and as soon as this hook is disengaged the pull exerted on the plow by the horses moving forward will elevate the subsoiler out of the ground. To place the subsoiler into the ground the lever is also moved rearwardly until the bolt which connects the links 12 and 13 with the lever 9 engages the lower edge of the beam 5. Thus it will be observed that the first backward movement of the lever 9 will disengage the hooks 17 from the brace 2 and a continuous movement thereof will cause the bolt to come into contact with the beam as above described and thus force the shovel or subsoiler 8 into the earth and after the subsoiler has been forced into the ground the lever 9 is released and the spring 10 thereof will cause the hook 17 to engage the bar 2 and thus hold the parts in operative position as shown in Fig. 2.

While the device is shown applied to a walking plow it is obvious that it may be used equally well on a sulky or a riding plow and it may be used for a variety of purposes which it is not thought necessary to enumerate.

I claim as my invention:

1. A subsoiler attachment for plows comprising a curved beam having a shovel at one end and attaching means at the other, a hook for engaging a portion of a plow for locking the attachment in operative position, and means for releasing said hook.

2. A subsoiler attachment for plows comprising a beam having a shovel mounted thereon, a hook pivotally mounted on said beam for engaging a portion of a plow to hold the attachment in operative position, a hook operating lever fulcrumed on said beam and links connecting said lever and hook.

3. A subsoiler attachment for plows comprising a beam having a shovel thereon, a hook pivotally mounted on said beam for engaging a portion of a plow to hold the attachment in operative position, a lever fulcrumed on said beam, links connecting said lever and hook and resilient means for connecting said lever to said beam.

4. A subsoiler attachment for plows comprising a semi-circular beam having a shovel at one end and a clevis at the other, a bell crank lever fulcrumed on said beam near its clevis end, resilient means in advance of the lever and connected with the beam and lever, a hook pivotally and adjustably mounted on said beam at the rear of said lever for engaging a portion of a plow for holding said attachment in operative position, and links adjustably connecting said hook and lever.

Respectfully submitted this 9th day of March, 1912.

C. J. JENSEN.

Witnesses:
E. W. SWANN,
A. L. ENCKSEN.

Copies of this patent may be obtained for five cents each, by addressing the "Commissioner of Patents. Washington, D. C."